Oct. 18, 1960
H. KIRKHAM
2,956,577
VALVE
Filed Nov. 16, 1956
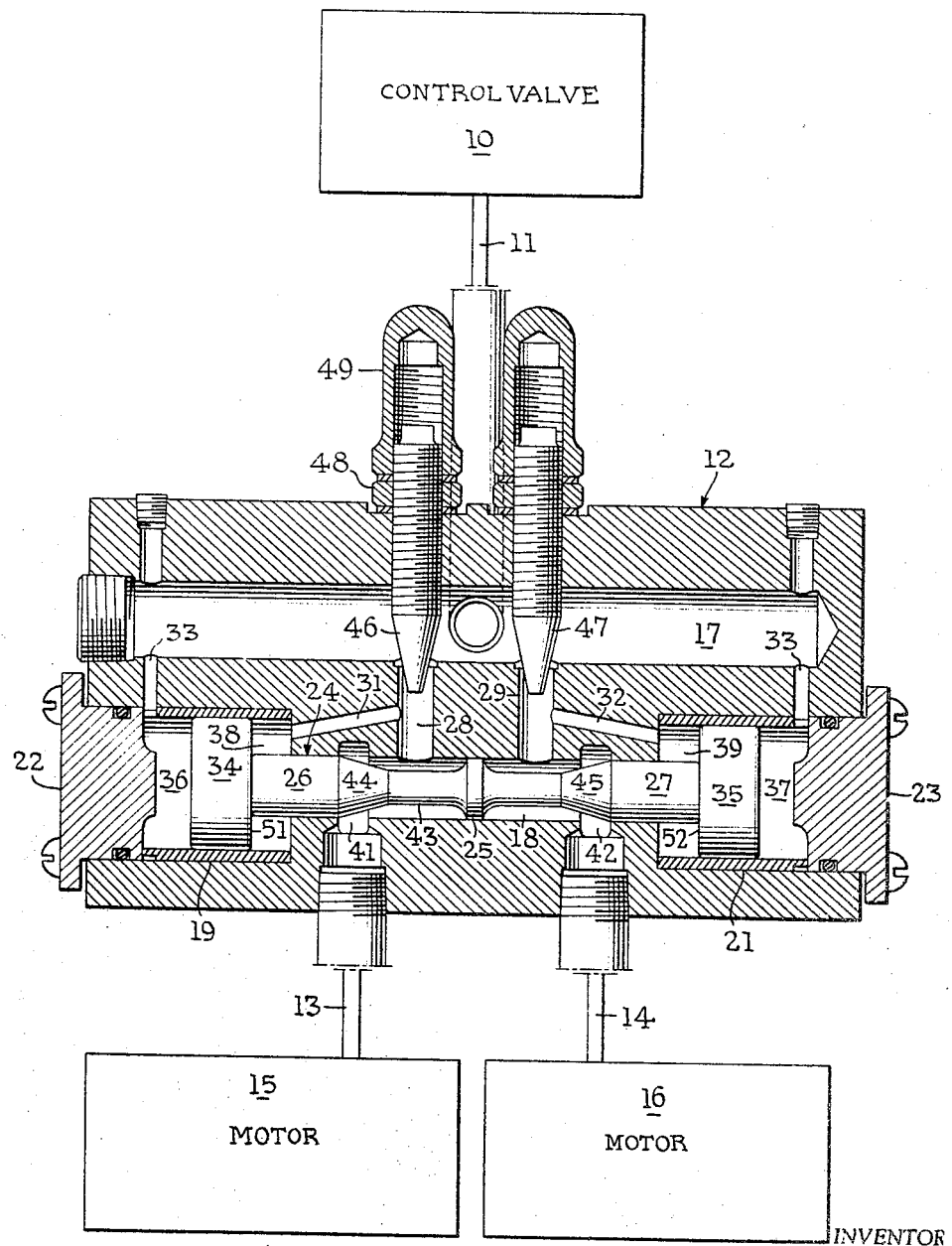
INVENTOR
Hall Kirkham
BY Dodge and Sons
ATTORNEYS

United States Patent Office 2,956,577
Patented Oct. 18, 1960

2,956,577

VALVE

Hall Kirkham, Cleveland, Ohio, assignor to The New York Air Brake Company, a corporation of New Jersey Filed Nov. 16, 1956, Ser. No. 622,640

12 Claims. (Cl. 137—101)

This invention relates to flow proportioning valves. Particularly it relates to a proportioning valve which may be used either as a flow dividing or as a flow combining valve and in which the flows, after division or before combination, can be adjusted to have any desired ratio to one another. This adjustment can be made without requiring the use of interchangeable parts to provide adjustability or the use of check valves in alternatively effective portions of the branch lines to provide reversibility. Prior art devices known to applicant have possessed either or both of these disadvantages.

The valve according to the present invention comprises a motor-operated throttling valve which is reversely shiftable to throttle increasingly flow through one branch line and to reduce the throttling of the flow through the other. The valve-operating motors are each actuated by a controlling pressure existing in a corresponding branch line at a point intermediate the throttling valve and a restriction located in that branch line between the throttling valve and the branch line's junction with the common line. Each motor means comprises a cylinder divided into two working spaces by a slidable abutment. One working space of each motor is connected to receive fluid from the common line and the second working space is connected to receive the controlling pressure from the corresponding branch line. A piston extends into each of the second working spaces and is connected to act in opposition to a corresponding piston of the other valve motor. The pistons are connected mechanically with one another and to operate the throttling valve. When serving as a combining valve, the controlling pressure in each branch line is higher than the pressure in the common line and varies in response to the rate of flow therefrom to the common line through the restriction. Because the branch line pressure is higher than common line pressure, the slidable abutments move away from the motor pistons so the valve means is shifted by the pistons in what will be termed the "positive sense" to throttle the flow through whichever branch line develops the higher controlling pressure and increase flow through the other whereby balanced pressures are reestablished in the motors. When used as a dividing valve, the common line pressure moves the abutments into thrust engagement with the opposed pistons. An unbalance of control pressures under these conditions will move the abutments and the pistons as a unit in a direction to cause the valve means to throttle flow through the branch line exhibiting the lower controlling pressure and increase flow through the other. Under these conditions the controlling pressure will be said to shift the valve in the "negative sense."

The invention will be described having reference to the accompanying drawing, in which the single figure comprises a diagrammatic showing of a complete circuit embodying the preferred form of the proportioning valve, the latter being shown in axial section.

The system includes a control valve 10 having the usual pump and sump connections (not shown) and a common line connection 11 which leads to the proportioning valve generally indicated at 12. Branch lines 13 and 14 lead from the proportioning valve 12 to single-acting motors 15 and 16.

The proportioning valve 12 comprises a housing having a bore 17 therein which is plugged at its outer end and into which the common line 11 opens. A valve bore 18 is formed in the body and has, at its opposite ends, counterbores 19 and 21, the outer ends of which are closed by sealing caps 22 and 23. Slidable in the valve bore 18 is a valve 24. The valve 24 includes a central land 25 and end lands 26 and 27. Drilled passages 28 and 29 extend from the bore 17 and intersect the valve bore 18 on opposite sides of the central land 25. Drilled passages 31 and 32 extend from the passages 28 and 29 to the counterbores 19 and 21 respectively. The opposite ends of the counterbores 19 and 21 are connected to the bore 17 by way of drilled passages 33. Movable abutments 34 and 35 are slidable in the counterbores 19 and 21 respectively, whereby two working spaces are formed in each counterbore. Hence, in the counterbores 19 and 21, there are respectively first working spaces 36 and 37 in constant open communication with the bore 17 by way of passages 33. The second working space 38 in the counterbore 19 is in constant comunication with the drilled passage 28, whereas the second working space 39 in the counterbore 21 is in constant comunication with the drilled passage 29.

The valve bore 18 is encircled by two annular chambers 41 and 42 which are respectively in flow communication with the branch lines 13 and 14. The lands 25 and 26 of valve 24 are separated by a reduced diameter portion having a generally cylindrical portion 43 and a portion 44 tapering from the land 26 toward the land 25. A similar tapered portion 45 is provided in the undercut portion between the lands 25 and 27.

Flow through the drilled passages 28 and 29 is controlled by needle valves 46 and 47 respectively. The needle valve 46 comprises a body threaded into the housing of the valve 12 and having a conical valve tip. The projecting threaded portion of the needle valve 46 carries a lock nut 48 and a cap 49. The construction of needle valve 47 is identical to that of needle valve 46 and need not be described in detail.

For the purposes of describing the operation of the valve, it will be first assumed that pressure fluid is flowing from the control valve 10 through the proportioning valve 12 to the motors 15 and 16. In other words, the valve 12 is functioning as a flow-dividing valve. It will also be assumed that the needle valves 46 and 47 are adjusted so as to produce an equal division of flow. This adjustment is made while branch lines 13 and 14 are maintained under equal pressure. As the fluid flows past the needle valves 46 and 47 into the drilled passages 28 and 29, a pressure drop is created. Thus, it will be seen that equal pressures will exist in the first motor spaces 36 and 37, superior to that in either second working space, which are in open communication with passages 28 and 39. This superior pressure will urge the abutments 34 and 35 into engagement with the ends of the plunger valve 24. If the motor 15 is more lightly loaded than motor 16, the rate of flow to that motor will increase above the rate of flow to the motor 16. This increased rate of flow will cause a greater pressure drop through the needle valve 46 than through the needle valve 47. This means that a lower pressure will exist in the working space 38 than will exist in the working space 39. These unbalanced pressures react in the previously defined negative sense on an effective area equal to the area of the annular portions 51 and 52 of the abutments 34 and 35 respectively and cause valve 24 and the abutments 34 and 35 to move as a unit to a position in which flow to the annular chamber 41 is increasingly throttled, thereby reducing the rate of flow through the passage 28, and simultaneously throttling of the flow through passage 29 is reduced. This will reduce the pressure drop through needle valve 46 and increase the drop through needle valve 47 and restore equality between the rate of flow in the passage 28 and that in the passage 29. It will be obvious that the valve 24 will be actuated to throttle flow to the annular chamber 42 if the rate of flow to the motor 16 exceeds the rate of flow to the motor 15.

By changing the settings of the needle valves 46 and 47, it is possible to vary the rates of flow through branch line 13 and through branch line 14. Thus, the valve 12 can be used to establish either equality of flow or any desired ratio of flows.

If the flow is occurring in the reverse direction, i.e. if fluid is being returned from the motors 15 and 16 through the proportioning valve 12 to the control valve 10, it will be seen that the valve 12 is functioning as a combining valve. Assuming further, that the needle valves 46 and 47 have been adjusted to afford equal flows in the branch lines 13 and 14 under equal pressure conditions, it will be seen that the valve 24 will, when the flow rates are equal, assume its illustrated position. However, due to the reverse flow condition, the pressure in the bore 17 will be less than that in the passages 28 and 29, because of the pressure drop which occurs through the needle valves 46 and 47. This means that a higher pressure will exist in the second working spaces 38 and 39 than exists in the first working spaces 36 and 37. Under these conditions, the movable abutments 34 and 35 will move away from the ends of the valve plunger 24 and into contact with the caps 22 and 23. Therefore, the ends of the valve plunger 24 (which are of equal diameter) will be exposed to the pressures in spaces 38 and 39 and act in opposition to one another.

If the rate of the return flow from the motor 15 increases above the return flow from the motor 16, an increased back pressure will be developed in the drilled passage 28 and in the second working space 38. This increased pressure in the working space 38 will shift the valve in the previously defined positive sense in a direction to throttle increasingly the return flow from the motor 15 and decrease the throttling of the flow in branch line 14 which will cause the back pressure in the passage 28 and the pressure in the working space 38 to be reduced, thereby restoring it to equality with the rising pressure in the working space 39 and the rising back pressure in the drilled passage 29.

It will be seen that a superior pressure in, for example the working space 38, will urge the valve plunger 24 in one direction (defined as the negative sense) when the valve is operating as a dividing valve, and in the reverse direction (defined as the positive sense) when the valve is functioning as a combining valve. The position of the abutments 34 and 35 governs the direction in which the resultant pressure force will urge the valve 24. It will also be apparent that by altering the adjustment of the needle valves 46 and 47, that any desired proportionality between rates of flow to the motors 15 and 16 can be created.

The valve 12 can be used to control flow to two double-acting motors or to two single-acting motors. Similarly, it may be used to control the exhaust flow from two double-acting motors. The circuit may include more than one proportioning valve, that is to say, if more than one flow division is required, a second proportioning valve could be located in either of the branch lines 13 or 14, or there could be a flow proportioning valve in each of the branch lines 13 and 14.

It will be readily apparent that fixed orifices could be substituted for the needle valves 46 and 47 and that these orifices could be equal or unequal in size depending upon the desired flow rates in the branch lines.

While the preferred embodiment of the valve has been described in some detail, no limitation to this precise construction is intended or should be inferred, except as is implied in the appended claims.

What is claimed is:

1. A proportioning valve comprising a housing having a valve bore therein; a balanced valve plunger shiftable in said bore and having a central land and two end lands interconnected by reduced diameter portions; a counterbore in each end of the valve bore and into which portions of said end lands project, said counterbores having equal diameters; a movable abutment in each of said counterbores defining a first and a second working space therein; a common line connection in said housing; means affording free flow between said first working spaces and said common line connection; branch line connections intersecting said valve bore at points on opposite sides of the central valve land and variably exposed by the edge of the corresponding end land; two intermediate flow connections each extending between said common line connection and said valve bore and intersecting said valve bore at points on opposite sides of the central land of said valve and between that land and the point of intersection of the corresponding branch line connection and said valve bore; a flow restrictor in each of said intermediate flow connections; and means affording a flow connection between each of said second working spaces and a corresponding intermediate flow connection at a point therein intermediate said restrictor and the intermediate flow connection's intersection with the valve bore.

2. The combination defined in claim 1 in which each of said restrictors comprises an adjustable orifice, said orifices being independently adjustable whereby the rates of flow in the branch lines may have any desired ratio to one another.

3. In a flow-proportioning device of the type including a common line, two branch lines connected in parallel flow relation with each other and in series flow relation with said common line, a throttling valve in each branch line, and a flow restrictor in each branch line between the valve therein and its junction with the common line, and serving to maintain a predetermined ratio between the rates of flow in the branch lines, the improvement consisting of motor means connected to said throttling valves and shiftable, in response to unbalance between controlling pressures existing in the branch lines between said valve and said restrictor, to vary the flows through the branch lines in inverse relation to one another, said motor means comprising in combination two motor cylinders, each cylinder including portions of different diameter; a piston slidable in each of the small diameter portions, said pistons being mechanically interconnected to act in opposition to one another and connected to shift said valve; a shiftable abutment in each of the large diameter portions of the motor cylinder, and defining in each a first and a second working space, each piston serving to limit movement of the corresponding abutment toward said small diameter portion; a flow connection between both first working spaces and said common line; and a flow connection between each second working space and its corresponding branch line at a point between the restrictor and the valve therein.

4. The combination defined in claim 3 in which the small diameter portions of the motor cylinders are coaxial and said throttling valves comprise a valve seat bore extending longitudinally between the coaxial portions and a plunger valve shiftable in said bore, the opposite ends of said plunger valve being said pistons.

5. The combination defined in claim 4 in which said restrictors are individually adjustable in size.

6. The combination defined in claim 3 in which said restrictors are individually adjustable in size.

7. The combination defined in claim 3 in which the valves are of the balanced piston type.

8. A flow-proportioning device indifferent to the direction of flow through a branched conduit comprising a common line and two branch lines in series flow relation therewith and in parallel with each other, said proportioning device comprising, in combination with said branched conduit, a balanced valve controlling flow through each of said branch lines and maintaining a desired ratio between the flows therein, said valve having a mean position in which it throttles equally flows in both branch lines and being shiftable in reverse directions from said mean position to throttle increasingly and according to the direction of shift the flow in a selected branch line while diminishing the throttling of the other branch line; a restrictor in each branch line between said valve and the lines' junction with the common line; a double-acting expansible chamber motor connected to shaft said valve and having respective working spaces each connected with a corresponding branch line at a point intermediate the valve and restrictor therein; and two floating pistons arranged to react oppositely on said valve, said pistons each being subject oppositely to common line pressure so as to react on said valve and each subject in the opposite direction to pressure in the corresponding motor working space, whereby when branch line pressures exceed common line pressure, said motor is effective to shift said valve in a positive sense, and when common line pressure is dominant, unbalanced pressures in the motor working spaces act subtractively in opposition to common line pressure and cause the floating pistons to shift said valve in the negative sense as contradistinguished from the aforesaid positive sense.

9. The combination defined in claim 8 in which said restrictors comprise individually adjustable valves.

10. The combination defined in claim 8 in which said valve is a plunger valve, and in which the valve plunger is the movable element of said double-acting expansible chamber motor.

11. In a flow-proportioning device of the type including a common line, two branch lines connected in parallel flow relation with each other and in series flow relation with said common line, a throttling valve in each branch line and a flow restrictor in each branch line between the valve therein and the line's junction with the common line, and serving to maintain a predetermined ratio between the rates of flow in the branch lines, the improvement which consists in motor means in flow communication with said common line and in flow communication with and responsive to an unbalance between the controlling pressures existing between the throttling valve and the restrictor in respective branch lines for moving the throttling valves in a direction to reduce the rate of flow through the branch line exhibiting the higher controlling pressure and increase flow through the other branch line, when branch line pressures exceed common line pressure, and for moving the throttling valves in a direction to reduce flow through the branch line exhibiting the lower controlling pressure and increase flow through the other branch line, when common line pressure exceeds the pressures in the branch lines.

12. In a flow-proportioning device of the type including a common line, two branch lines connected in parallel flow relation with each other and in series flow relation with said common line, a throttling valve in each branch line and a flow restrictor in each branch line between the valve therein and the line's junction with the common line, and serving to maintain a predetermined ratio between the rates of flow in the branch lines, the improvement which consists in means in flow communication with said common line and in flow communication with and responsive to an unbalance between the controlling pressures existing between the throttling valve and the restrictor in respective branch lines for shifting the throttling valves in a direction to reduce flow through the branch line exhibiting the higher controlling pressure and increase flow through the other branch line, when branch line pressures exceed common line pressure; and second means in flow communication with said common line and in flow communication with and responsive to an unbalance between the controlling pressures existing between the throttling valve and the restrictor in respective branch lines for shifting the throttling valves in a direction to reduce flow through the branch line exhibiting the lower controlling pressure and increase flow through the other branch line, when branch line pressure exceeds the pressures in the branch lines.

References Cited in the file of this patent

UNITED STATES PATENTS

| 2,460,774 | Trautman | Feb. 1, 1949 |
| 2,466,485 | Schultz | Apr. 5, 1949 |

FOREIGN PATENTS

| 374,886 | Great Britain | June 6, 1932 |

UNITED STATES PATENT OFFICE
CERTIFICATE OF CORRECTION

Patent No. 2,956,577                     October 18, 1960

Hall Kirkham

It is hereby certified that error appears in the printed specification of the above numbered patent requiring correction and that the said Letters Patent should read as corrected below.

Column 4, line 53, for "valve" read -- valves --; column 5, line 15, for "shaft" read -- shift --.

Signed and sealed this 11th day of April 1961.

(SEAL)
Attest:
ERNEST W. SWIDER
Attesting Officer

ARTHUR W. CROCKER
                                   Acting Commissioner of Patents